Aug. 11, 1931.    O. A. ROSS    1,818,650
SEAL
Filed April 4, 1927    2 Sheets-Sheet 1

INVENTOR
Oscar A. Ross.

Aug. 11, 1931.                O. A. ROSS                    1,818,650
                                 SEAL
                           Filed April 4, 1927          2 Sheets-Sheet 2
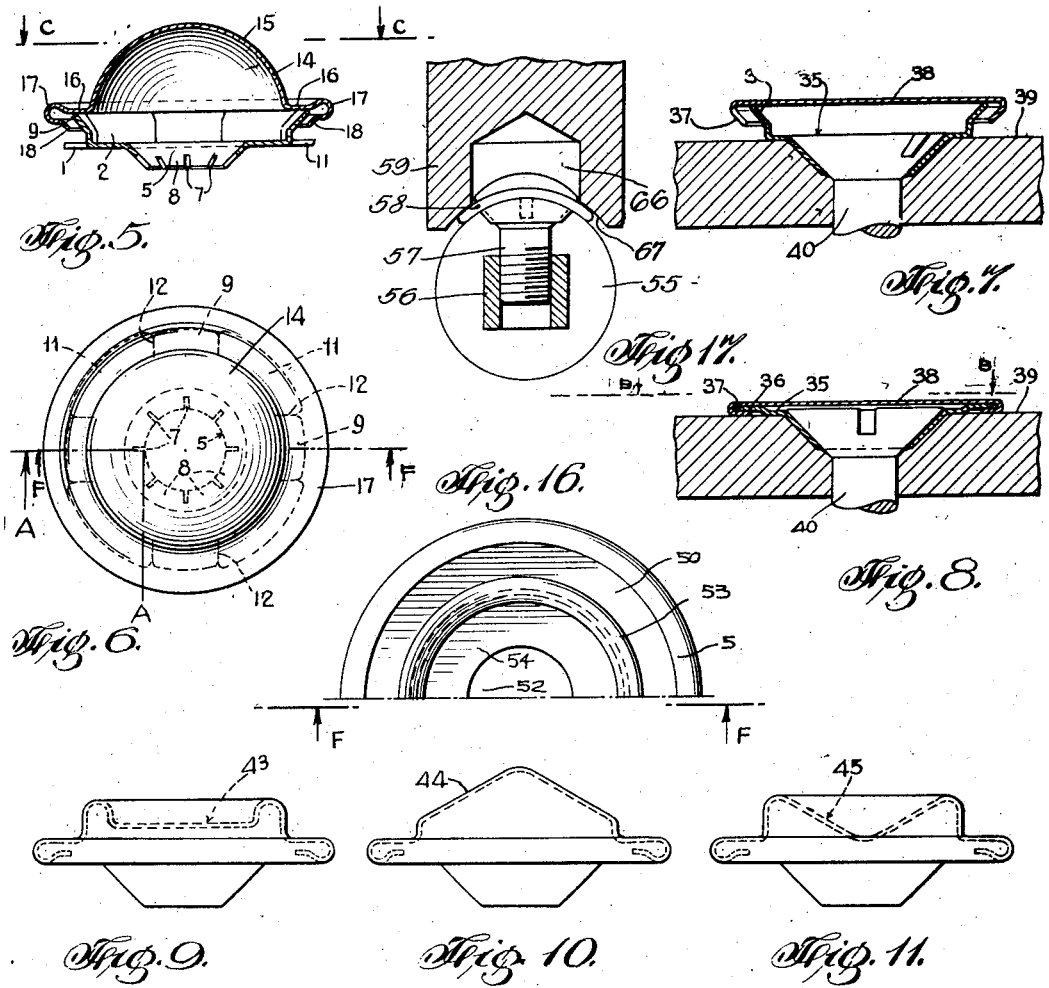
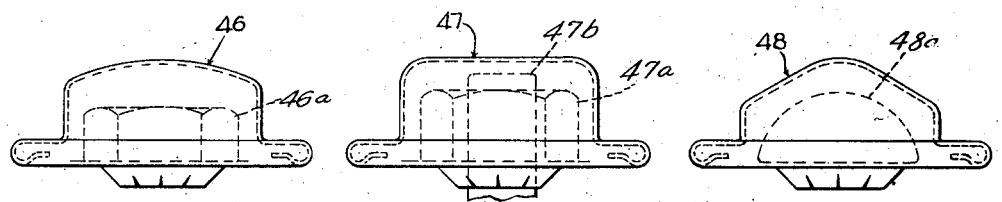
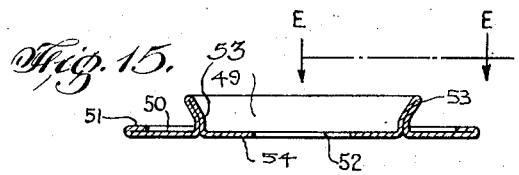
INVENTOR
Oscar A. Ross.

Patented Aug. 11, 1931

1,818,650

UNITED STATES PATENT OFFICE

OSCAR A. ROSS, OF NEW YORK, N. Y.

SEAL

Application filed April 4, 1927. Serial No. 180,798.

This invention relates to seals and more particularly to a two part seal for concealing the protruding portion of fasteners.

One of the objects of this invention is to furnish an ornamental seal comprising two semi-formed members arranged to enclose the protruding end portion of a fastener during the complete forming of the semi-formed members as they are interlocked over the protruding end of the fastener.

Another object of the invention is to furnish a readily applicable seal for covering the protruding end portion of screws, bolts, bolt ends or nuts of building hardware whereby the removal of said hardware by theft is made more difficult.

Another object of this invention is to furnish an ornamental covering for hardware fasteners whereby ordinary low cost fasteners may be employed at substantially all points and said coverings may be selected to match the design or finish of the hardware secured by said fasteners.

Another object is to furnish a seal for the protruding ends of fasteners whereby said seal may be attached with an ordinary short length of metal tubing thereby avoiding the supplying of special tools for the attachment of said seals.

Another object is to furnish a two part semi-formed seal, the parts of which may be temporarily secured together for stock or storage before the attachment of said seals to the protruding ends of allocated fasteners.

Other objects and advantages will appear as the description of the invention progresses, and the novel features of the invention will be pointed out in the appended claims.

This invention consists in the novel construction and arrangement of parts hereinafter described, delineated in the accompanying drawings, and particularly pointed out in that portion of this instrument wherein patentable novelty is claimed for certain and peculiar features of the device, it being understood that, within the scope of what hereinafter thus is claimed, divers changes in the form, proportions, size and minor details of the structure may be made without departing from the spirit of, or sacrificing any of the details of the invention.

In describing the invention in detail, reference is had to the accompanying drawings, wherein I have illustrated embodiments of my invention, and, wherein like characters of reference, designate corresponding parts throughout the several views, and, in which:—

Figure 1:
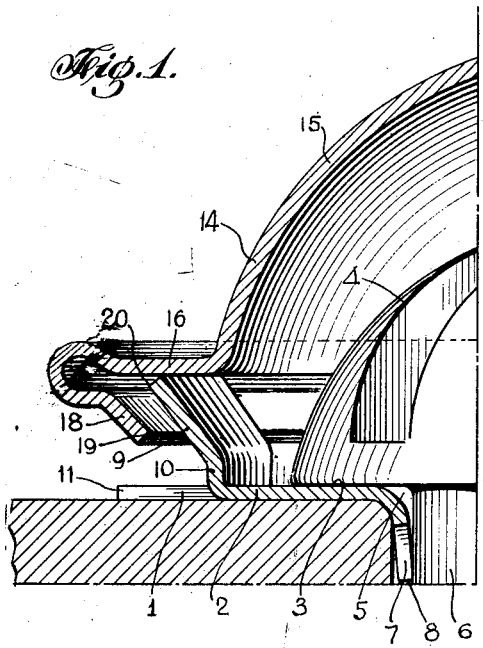
Figure 2:
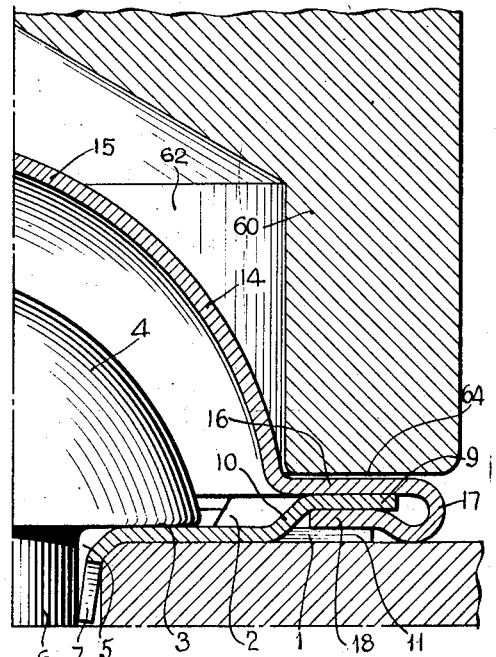
Figure 3:
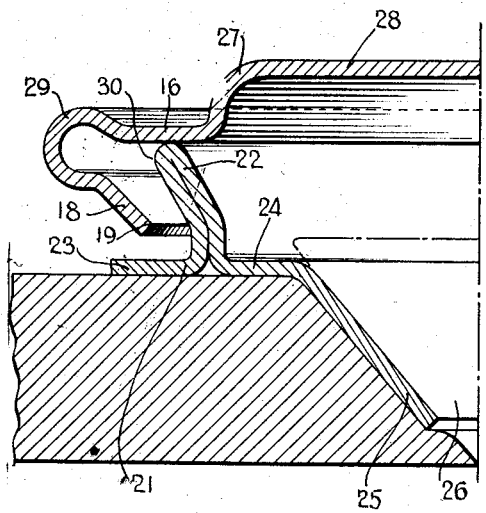
Figure 4:
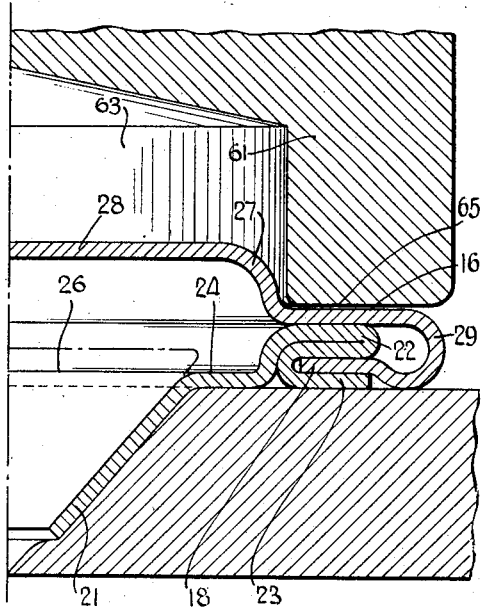

Figure 1 is a part sectional view of one form of combined interlocking washer and cover, the washer of which is secured to place by a round head screw and the interlocking cover in position to be interlocked with said washer whereby the head of the screw will be sealed, and is taken on line A—A of Fig. 6, and, Fig. 2 is a similar view showing the washer and cover interlocked thereby forming a seal over the head of the screw, and, Fig. 3 is a view similar to Fig. 1, showing a modified form of interlocking, the washer being adapted for flat head screws, or other fasteners having similar heads, and, Fig. 4 is a similar view showing the washer and cover interlocked over a flat headed fastener forming a seal therefor, and, Fig. 5 is a sectional view of a complete seal comprising the interlocking washer and cover temporarily assembled for shipment, or stock, and is taken on line F—F of Fig. 6, and, Fig. 6 is a top elevated view of the same, taken on line C—C of Fig. 5, and Fig. 7 is a sectional view of a modified form of interlocking washer and cover forming a seal of minimum height for flat headed fasteners, and is taken on line B—B of Fig. 8, and, Fig. 8 is a similar view after the washer and cover have been interlocked to form a seal over the head of the fastener, and, Figs. 9, 10, 11, 12, 13, and 14, are sectional views of interlocking covers showing some of the modified forms into which the head portion of said covers may be formed, also showing some of the forms of bolt heads, nut and bolt ends, screw heads and drive pins which said covers may seal, and Fig. 15 is a modified form of interlocking washer and is taken on line F—F of Fig. 16, and Fig. 16 is a part elevated view of the same taken on line E—E of Fig. 15, and Fig. 17 is a part elevated view showing a seal attached to a door knob screw and a special tool employed for sealing.

Referring to Figs. 1, 2, 5 and 6, the interlocking washer 1, comprises center section 2, onto which the impinging surface 3, of round head fastener 4, is adapted to seat. The washer hole 5, through which the body 6, of screw 4, is inserted, is preferably formed funneled shaped, and provided with slots as 7—7, whereby screws, or other fasteners of various diameters may be employed for a given size of seal. As the fastener body, as 6, is constrained to pass through the hole 5, the projections 8—8 formed by the slots 7—7, are constrained outward and thereby act to center the fastener in the washer as well as secure said washer to the fastener body while said fastener is being inserted, or while a number of fasteners are being fitted with interlocking washers of a particular type, or finish, prior to the assembly of the articles to which the particular type of seals are to be attached.

Washer 1 also comprises in part, the frusto-conically semi-formed locking portions 9—9 extending diagonally upwardly outwardly except for a vertical portion 10—10 adjacent the center portion 2, and are formed from the outer portion of the flat blank, leaving flat portions, as 11—11, circumferentially interposed between said locking portions 9—9, slots 12—12 accommodating such differentiation in form.

Cover, or cap 14 of the seal, comprises head section 15, which may be of varied form, as shown in Figs. 9 to 14 inclusive, the base of which continues in an annular flat portion 16, the outer edge of which continues in a bead, or partial torically formed portion 17, the lower edge of which continues in frusto-conically semi-formed annular portion 18 comprising the locking portion or rim of the cover, as 14. The corner, or circumferential edge 19, is constrained to pass the similar edge 20 of locking portions 9—9 of washer 1, such constraining action permitting in temporary assembly of the washer and cover for finishing, shipment, or stock.

Referring to Figs. 3 and 4, the modified washer 21, comprises a frusto-conically semi-formed locking portion 22 of double thickness material formed out of the blank and extends diagonally upwardly and outwardly in the same manner as interlocking portions 9—9 of washer 1, however locking portion 22 is complete circumferentially, as is the flange portion 23, the slots as 12—12 of washer 1, being omitted. The major portion of the center portion 24 has been formed into a funnel shaped portion 25 to accommodate the under side of a flat headed fastener as 26a.

Cover, or cap 27 comprises the modified head section 28, of substantially low height adapted to seal a flat headed fastener, and the bead, or partial torically formed portion 29, is of comparatively larger diameter than the similar portion 17 of cover 14, to accommodate the double thickness of material comprising the locking portion 22 of washer 21. The edge 19 of the frusto-conical semi-formed locking portion 18 of cap member 27 is also preferably arranged whereby its movement past the edge 30 of locking portion 22 is sufficiently restrained to prevent said cap from inadvertently being removed from the washer after temporary assembly and before the seal receives final attachment.

Referring to Figs. 7 and 8, the modified form of interlocking washer 35 comprises a circumferentially continuous frusto-conical semi-formed locking portion, as 36, of single thickness material. The outer flange portion as 23 of washer 21, has been omitted whereby the frusto-conical semi-formed locking portion 37 of cover 38 is constrained to be locked between the locking portion 36 of washer 35, and the surface 39 of the material into which the head of screw 40 impinges. By this novel arrangement of seal, only three thicknesses of material occur at the completely formed, or interlocked section in this manner furnishing a seal of minimum height for use between butt hinges, or similar locations where a substantially flat contour is desired.

Fig. 9 illustrates one of applicant's novel seals after final assembly, the cap or cover 43, of which, is cup shaped. Fig. 10 illustrates a similar seal, the cover 44, of which, is cone shaped whereas Fig. 11 is a similar seal the cover 45, of which, is inverted cone shaped. Fig. 12 illustrates a similar seal, the cover 46, of which, has a French head shape, and is shown sealing a hexagon shaped bolt head. Fig. 13 illustrates a similar seal, the cover 47, of which, has a plug shaped head, and is shown sealing a bolt and nut end 47a and 47b. Fig. 14 illustrates a similar seal, the cover 48, of which, has a compromise plug, cone and round shaped head, and is shown sealing a drive pin, or escutcheon pin head 48a.

Figs. 15 and 16 illustrate a modified form of interlocking washer 49, of extra large diameter as compared with the fastener head adapted to be sealed by said washer and its relative cover (not shown), and comprises the center portion 54, perforation 52, frusto-conically semi-formed locking portion 53 and a comparatively wide flange 50, the outer edge portion of which may be turned upwardly or downwardly to form the bead 51.

Fig. 17 illustrates one of applicant's novel seals applied to a screw of a door handle knob and the method of applying the said seal thereto. Knob 55 is secured to the knob shaft 56 by the usual screw 57, to the head of which has been attached seal 58 interlocked to position by the phening surface 61 of tool 59, in this manner making the theft of knob 55 more difficult.

For ordinarily performing the completely formed, or interlocking operation, setting tools as 59, 60 and 61 are preferably employed, such tools comprising counter-bores, as 62, 63 and 66, see Figs. 2, 4, and 17, into which the heads of the cover, as 14, freely enter while the phening surfaces, as 64, 65 and 67 descend and cause complete forming or interlocking of the washer and cover to form the seal.

The interlocking operation occurs as follows: referring to Figs. 1 and 2, as the locking tool 60 is driven downwardly with a hammer, or other tool to completely form the seal, the phening surface 64 thereof causes the lower surface of annular portion 16 to constrain locking portions 9—9 downwardly and outwardly and into the interior of the bead 17. After a definite downward movement of cover 14, the interlocking portion 18 impinges on the upper surface of portions 11—11 and said locking portion is constrained inwardly finally becoming interlocked between locking portions 9—9 and portions 11—11, whereas the portions 9—9 are interlocked between the locking portion 18 and the bottom surfaces of annular portion 16, see Fig. 2.

Referring to Figs. 3 and 4, as the locking tool 61 is driven downwardly, its phening surface 65 thereof causes the under side of annular portion 16 to constrain locking portion 22 into interlocked arrangement with the under side of said annular portion and the upper surface of locking portion 18, whereas said portion 18 becomes interlocked with locking portion 22 and the flange portion 23, see Fig. 4, as the semi-formed locking portions are completely formed over the protruding portion of the fastener.

Referring to Figs. 7 and 8, any flat ended instrument may be employed to interlock washer 35 and cover 38. As said cover is driven downwardly to completely form the semi-formed locking portions the locking portion 36 becomes interlocked between the under surface of cover 38 and the locking portion 37, whereas the portion 37 becomes interlocked between the locking portion 36 and the surface 39 of the article into which screw 40 is inserted.

Ordinarily the material employed in the manufacture of applicant's novel form of seals is metal, as for example sheet brass, steel, or aluminum, one, or both surfaces of which may be finished before forming the seal structure.

The thickness of material employed in the manufacture of applicant's novel seals is preferably four to eight thousandths thick for small screws and other fasteners ordinarily employed in building hardware, and of proportionate greater thickness for larger fasteners. For large bolts and nuts material one eighth to three sixteenths may be employed and the seals interlocked with pneumatic hammers.

By employing .004 thickness material in a seal of the type shown in Figs. 7 and 8, the total thickness will be approximately .012 or .024 inches required space between two opposing flat head screws in a butt hinge. Practically all commercial butt hinges of comparatively small size have this clearance in closed position.

What I claim is:—

1. A two part seal arranged to be applied to the exposed portion of a removable fastener comprising in combination; a centrally orificed washer member through which the fastener protrudes forming the base of the seal arranged to be positioned as the fastener is secured in place, an upwardly extending concentric locking rim portion formed on the washer positioned between the orifice and the periphery thereof, a cap member arranged to form an enclosure for the exposed portion of the fastener, a downwardly extending locking rim portion formed thereon arranged to surround the washer locking rim portion as the cap member is initially placed over the locking rim portion of the washer member and to be bent into interlocked relation between the washer locking rim portion and the upper surface of the washer when the cap member and the washer member are locked together with a tool.

2. An article adapted to be applied to the exposed portion of a removable fastener which comprises; a centrally orificed washer member through which the fastener protrudes forming the base of the seal and arranged to be positioned as the fastener is secured in place, a locking member formed on the washer member between the orifice and the periphery thereof, a cap or seal member formed to enclose the exposed portion of the fastener, and a locking member joined to the peripheral portion thereof arranged to surround the washer locking member and be bent into interlocked relation therewith to form a seal over the exposed portion of the fastener.

3. An article adapted to be applied to the exposed portion of a removable fastener which comprises; a centrally orificed washer member through which the fastener protrudes arranged to be positioned as the fastener is secured in place, an upwardly and outwardly extending locking member formed thereon between the orifice and the periphery thereof, a cap or seal member formed to enclose the exposed portion of the fastener, and a downwardly and inwardly extending locking member formed thereon arranged to surround the washer locking member and be bent into interlocked relation therewith to form a seal over the exposed portion of the fastener.

4. An article adapted to be applied to the exposed portion of a removable fastener which comprises; an orificed washer through which the fastener protrudes arranged to form the base of the seal as the fastener is secured in place, a frusto conical locking rim portion formed thereon positioned spacedly between the orifice and the peripheral edge thereof, a cap or seal member formed to enclose the exposed portion of the fastener, a frusto conical locking rim portion formed thereon arranged to surround the washer locking rim portion and be bent into interlocked relation therewith to form a seal over the exposed portion of the fastener.

5. An article adapted to be applied to the exposed portion of a removable fastener which comprises; an orificed washer member through which the fastener protrudes arranged to be positioned as the fastener is secured in place, a semi-formed locking member positioned to extend upwardly above the surface on which the washer member rests, an inverted frusto conical portion formed on the washer member positioned between the orifice and the locking member arranged to extend into the body on which the washer member rests, an enclosing member formed to enclose the exposed portion of the fastener, and a semi-formed locking member formed thereon arranged to surround the washer locking member and be interlocked therewith as the locking members are completely formed to effect a seal over the exposed portion of the fastener.

6. An article adapted to be applied to the exposed portion of a removable fastener which comprises; an orificed washer member through which the fastener protrudes arranged to be positioned as the fastener is secured in place, a semi-formed locking member positioned to extend upwardly above the surface on which the washer member rests, an inverted frusto conical portion formed on the washer member positioned between the orifice and the locking member arranged to enter into the body on which the washer member rests, radially disposed slots formed in the frusto conical portion at the lower extremity thereof, an enclosing member formed to enclose the exposed portion of the fastener, and a semi-formed locking member formed thereon arranged to surround the washer locking member and be interlocked therewith as the locking members are completely formed to effect a seal over the exposed portion of the fastener.

Signed at New York, in the county of New York, and State of New York, this 2nd day of April, A. D. 1927.

OSCAR A. ROSS.